United States Patent
Cash

(10) Patent No.: US 10,078,744 B2
(45) Date of Patent: Sep. 18, 2018

(54) AUTHENTICATION-ACTIVATED AUGMENTED REALITY DISPLAY DEVICE

(71) Applicant: Visa International Service Association, San Francisco, CA (US)

(72) Inventor: Duane Matthew Cash, Mt. View, CA (US)

(73) Assignee: Visa International Service Association, San Francisco, CA (US)

(*) Notice: Subject to any disclaimer, the term of this patent is extended or adjusted under 35 U.S.C. 154(b) by 114 days.

(21) Appl. No.: 15/058,440

(22) Filed: Mar. 2, 2016

(65) Prior Publication Data

US 2016/0259929 A1    Sep. 8, 2016

Related U.S. Application Data

(60) Provisional application No. 62/127,184, filed on Mar. 2, 2015.

(51) Int. Cl.
| | |
|---|---|
| G06F 21/00 | (2013.01) |
| H04L 9/32 | (2006.01) |
| G06F 21/32 | (2013.01) |
| G06Q 20/08 | (2012.01) |
| G06F 21/10 | (2013.01) |

(52) U.S. Cl.
CPC .................... G06F 21/32 (2013.01)

(58) Field of Classification Search
CPC ..................................................... G06F 21/32
See application file for complete search history.

(56) References Cited

U.S. PATENT DOCUMENTS

| | | |
|---|---|---|
| 8,733,638 B2 | 5/2014 | Mullen et al. |
| 2005/0269402 A1 | 12/2005 | Spitzer |
| 2006/0107067 A1 | 5/2006 | Safal et al. |
| 2006/0118621 A1 | 6/2006 | Burchette, Jr. |
| 2008/0105751 A1 | 5/2008 | Landau |

(Continued)

FOREIGN PATENT DOCUMENTS

| | | | |
|---|---|---|---|
| WO | WO 2013/131153 | 4/2012 | |
| WO | WO 2017034476 A1 * | 3/2017 | ......... G06Q 20/3821 |

OTHER PUBLICATIONS

T. Charles Clancy, Negar Kiyavash, Dennis J. Lin; "Secure smartcardbased fingerprint authentication"; Nov. 2003; WBMA '03: Proceedings of the 2003 ACM SIGMM workshop on Biometrics methods and applications; Publisher: ACM; pp. 45-52.*

(Continued)

*Primary Examiner* — Kendall Dolly
*Assistant Examiner* — Courtney Fields
(74) *Attorney, Agent, or Firm* — Kilpatrick Townsend & Stockton LLP

(57) ABSTRACT

A portable device is provided. The portable device may include a display; an input device; a camera; a processor coupled to the display, the input device, and the camera; and a computer readable medium coupled to the processor, the computer readable medium comprising code, executable by the processor, to implement a method comprising: receiving authentication data from the input device, determining whether the received authentication data matches authentication data associated with an authorized user, and displaying, on the display, a credential, an item, and data associated with the item.

18 Claims, 6 Drawing Sheets

(56) References Cited

U.S. PATENT DOCUMENTS

| | | |
|---|---|---|
| 2011/0193477 A1 | 8/2011 | Lifka et al. |
| 2013/0208103 A1* | 8/2013 | Sands ................... G06F 21/31 348/78 |
| 2014/0082134 A1 | 3/2014 | Hunter |
| 2014/0258110 A1* | 9/2014 | Davis ................. G06Q 20/227 705/41 |
| 2015/0186984 A1 | 7/2015 | Loganathan |
| 2015/0349292 A1 | 12/2015 | Premutico et al. |

OTHER PUBLICATIONS

International Search Report and Written Opinion, dated Jul. 18, 2016, in PCT/US2016/020361, 10 pages.

* cited by examiner

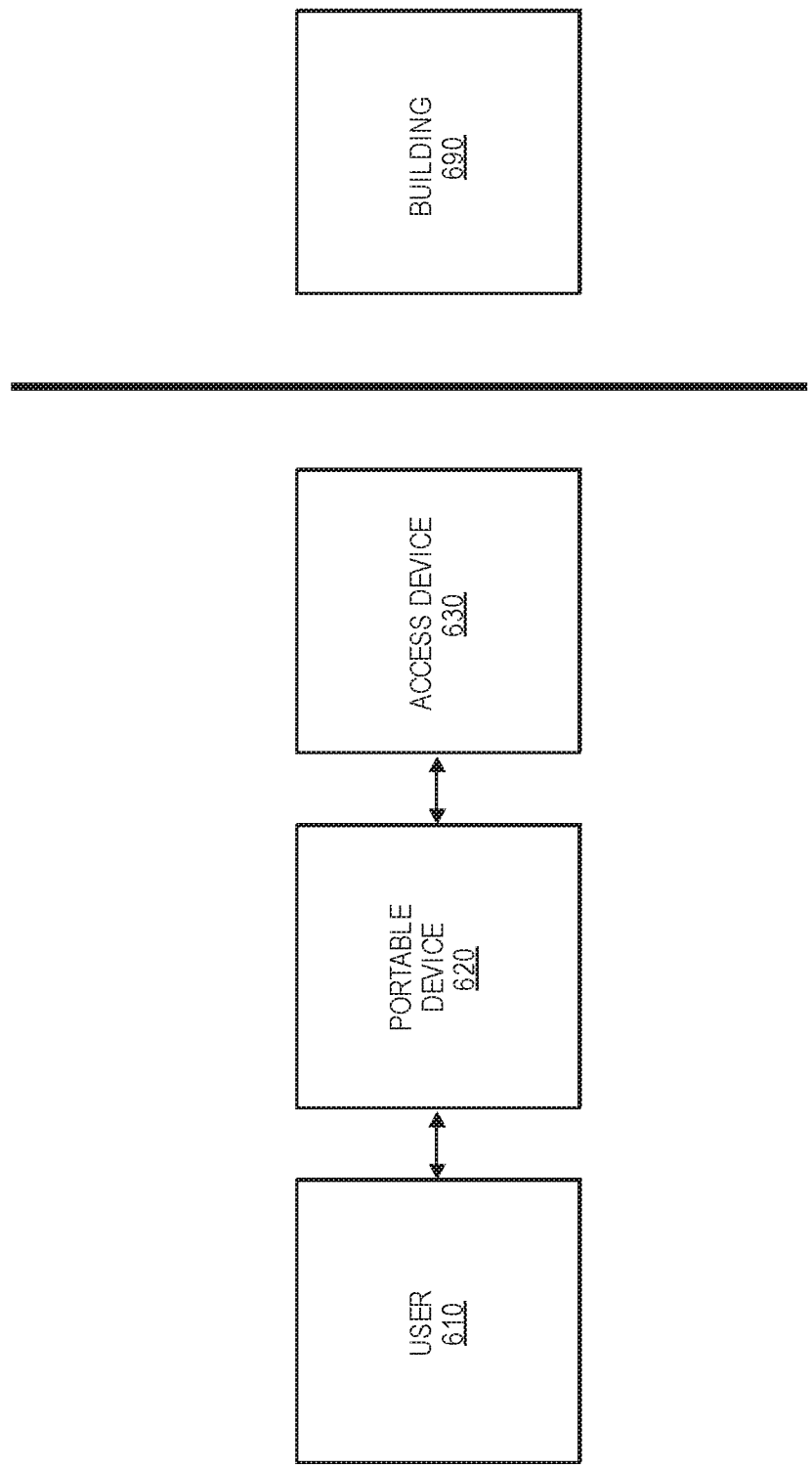

AUTHENTICATION-ACTIVATED AUGMENTED REALITY DISPLAY DEVICE

CROSS-REFERENCES TO RELATED APPLICATIONS

This application claims priority to U.S. Provisional Patent Application No. 62/127,184, filed Mar. 2, 2015, and is herein incorporated by reference in its entirety.

BACKGROUND

The use of cards with sensitive data printed on them is problematic. For example, a traditional credit card is vulnerable to "over-the-shoulder" information stealing by a fraudster. If the fraudster obtains the credit card number printed on the credit card, she can conduct fraudulent transactions.

In addition, conventional methods for processing transactions can be slow and cumbersome. For example, an existing payment process may involve a user using a computer to obtain information about an item, go to a store to view the item, and using a payment card and a POS terminal to conduct a transaction.

Embodiments of the invention solve these problems, both individually and collectively.

SUMMARY

Embodiments of the invention are directed to portable devices and methods which provide better data security and convenience.

One embodiment of the invention is directed to a portable device comprising: a display; an input device; a camera; a processor coupled to the display, the input device, and the camera; and a computer readable medium coupled to the processor, the computer readable medium comprising code, executable by the processor, to implement a method comprising: receiving authentication data from the input device, determining whether the received authentication data matches authentication data associated with an authorized user, and displaying, on the display, a credential, an item, and data associated with the item.

Another embodiment of the invention is directed to a method of using a portable device comprising a display, an input device, a camera, and a processor coupled to the display, the input device, and the camera, the method comprising: receiving authentication data from the input device, determining whether the received authentication data matches authentication data associated with an authorized user, and displaying, on the display, a credential, an item, and data associated with the item.

These and other embodiments of the invention are described in further detail below.

BRIEF DESCRIPTION OF THE DRAWINGS

FIG. 6 shows a block diagram of a building access system.

DETAILED DESCRIPTION

Figure 1A:
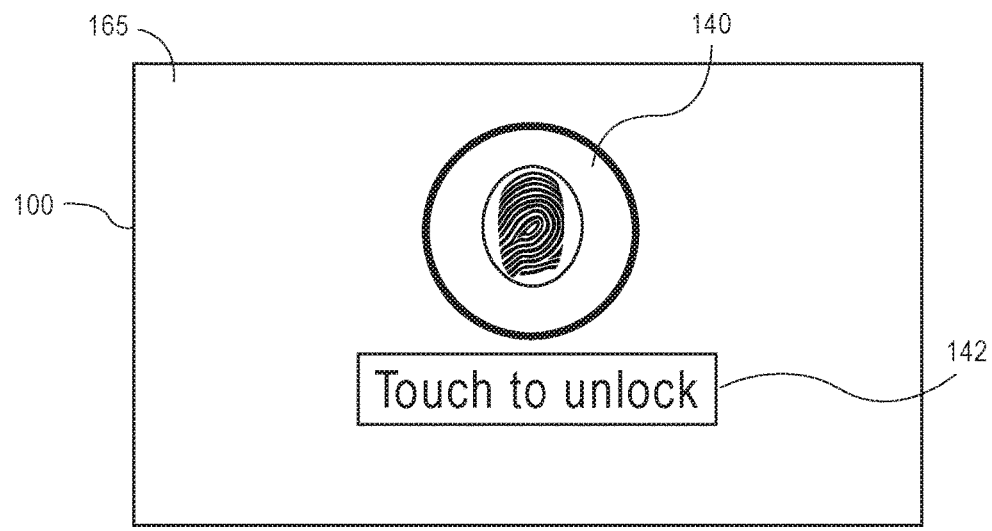
FIGS. 1A and 1B respectively depict a portable device in two different operational modes.

One embodiment of the present invention relates to a flexible semi-transparent portable device with an embedded camera and processor (e.g., graphene controller chip) for processing image and transaction data. The portable device may comprise a transparent organic light-emitting diode (OLED) type display. In some embodiments, the portable device may display purchase item information for products while also displaying the products themselves. The portable device may also comprise a thin fingerprint capacitive sensor that be used to unlock the device and confirm a purchase.

The flexible semi-transparent portable device solves a number of problems. For example, embodiments of the invention allow a user (e.g., cardholder) to unlock the portable device by receiving a fingerprint scan from the user on the portable device. In some embodiments, the user may be required to touch a fingerprint sensor pad on the portable device before any credentials (e.g., account numbers) are shown to the user. When the portable device is unlocked, the user is able to view the credentials and can use the portable device as a display portal to identify a purchase item and view augmented elements on the portable device itself. In some cases, if the portable device is not inherently transparent, a camera in the portable device allows the user to view items through the transparent display in a fashion similar to the way people view items on a mobile device. A processor in the portable device can run an algorithm used to recognize the items being viewed through pattern recognition or object identification. Additional algorithms stored in the portable device can determine how to present data associated with the items viewable through or with the aid of the portable device.

In some embodiments, during a transaction, a user may place her fingerprint on a fingerprint sensor pad on the portable device to confirm a transaction. Once confirmed, the transaction may thereafter be processed through a payment system. In some embodiments, the portable device may process transactions through the payment system similar to the way payments are currently processed with online merchants. The transaction may be ultimately authorized using an issuer and an acquirer, such that the transaction can be completed through the portable device.

In some embodiments, the portable device has two modes. The first mode can be a locked mode. In the locked mode, no credentials (e.g., user's name, PAN, expiration date, security code, etc.) are displayed on the portable device. In some embodiments, the only element that is displayed or is visibly present on the device may be the fingerprint sensor pad and a prompt to touch the pad to unlock the portable device.

The second mode may be a transaction mode (e.g., a purchase mode). In the transaction mode, the portable device is in an unlocked state, as it has been successfully unlocked by the user (e.g., by providing an appropriate biometric such as a fingerprint). In the transaction mode, if the display is not already transparent, the display may be or become transparent or semi-transparent allowing the user to see through the device. The display change may be caused by a change in the properties of the display.

In the second mode, in some embodiments, the camera in the portable device may be activated and the processor that is coupled to the camera may scan for visual markers, items or identifiers to recognize. In addition, in the second mode, the user's account information may be displayed on the portable device along with the name and the expiration date of the account. The portable device may also enable or show a small fingerprint sensor to confirm the transaction. Once the transaction is confirmed, the portable device may return to the first locked mode and may display a short confirmation message regarding the present transaction. Once the current transaction is completed, the portable device may then return to a more opaque color or appearance, thereby signaling to the user that the portable device is ready to be unlocked to conduct another transaction.

Embodiments of the invention may be better understood by way of an illustrative example. In one example, a user (e.g., cardholder) may enter a merchant location and find an item to purchase. The user may then take out her portable device and touch a fingerprint sensor displayed on the card to unlock the card. In some embodiments, prior to unlocking the card, the card may be opaque in appearance such that the user is not able to see through it. Once unlocked, the card may then enter the purchase mode described above and the camera in the portable device may be activated. The card may transform into a translucent or transparent appearance. The card may also display the user's credit card account number (e.g., PAN) much like a traditional credit card along with the name on the account and expiration date of the account.

The user may then hold the portable device so that the item is displayed to the user by or through the portable device. Item information such as the price of the item and other information may also be shown on the display of the portable device. Such item information can be retrieved after a camera captures and processes an identifier (e.g., a barcode) near the portable device. Such information could alternatively be retrieved after the camera captures an image of the item to be purchased. The processor in the portable device may then use object recognition software to recognize the item that is being displayed by or through the card, and may then retrieve the item information.

Once the user is satisfied with the price of the item, the user may then confirm the purchase of the item by touching her fingerprint on the fingerprint sensor pad. The portable device may then confirm the identity of the user and may then complete the purchase. Further details regarding other steps that can be used in the purchase process are provided below. The display may then return to the locked mode and may briefly show any additional messages to the user about the purchase.

Before discussing further specific embodiments and example, some descriptions of terms used herein are provided below.

An "access device" may be any suitable device that provides access to a remote system. An access device may also be used for communicating with a resource provider (e.g., merchant) computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Further, an "access device" may be an example of or part of a "resource provider computer," if the access device is operated by a resource provider.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

"Authentication data" may include any suitable data that may serve to authenticate a user. In some embodiments, authentication data comprises biometric data such as fingerprints, retinal scans, DNA samples, voiceprints, facial images, etc. In other embodiments, "authentication data" may include passwords or PINs (personal identification numbers).

An "authorization request message" may be an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorized user" is a user who should be allowed access to a portable device and/or certain credentials. For example, an authorized user may be an owner of a portable device. In another example, an authorized user may be an account holder of an account associated with a portable device. An authorized user may also be a third party user of a portable device given permission by an owner, or a third party not associated with the account given permission by an account holder.

An "authorizing entity" may be an entity that authorizes a request. Examples of an authorizing entity may be an issuer, a governmental agency, a document repository, an access administrator, etc.

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

An "identifier" is any combinations of letters, numbers and/or images that uniquely identify an asset (e.g., a physical item, data, etc.). Examples of identifiers include bar codes, QR codes, names, logos, trademarks, designs, SKUs, patterns, and the like.

An "issuer" may typically refer to a business entity (e.g., a bank) that maintains an account for a user. An issuer may also issue payment credentials stored on communications devices.

An "item" may include any suitable physical object. Examples of items include goods to be sold (e.g., watches, clothes, automobiles, etc.), buildings or parts thereof, terminals, etc.

A "portable device" may comprise any suitable electronic device that may be operated by a user. In some embodiments, a portable device may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of portable devices include cards, mobile phones (e.g., cellular phones), PDAs, tablet computers, net books, laptop computers, personal music players, handheld specialized readers, wearable devices, as well as automobiles with remote communication capabilities.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may also be a cloud based computational and data storage solution.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

Figure 1B:
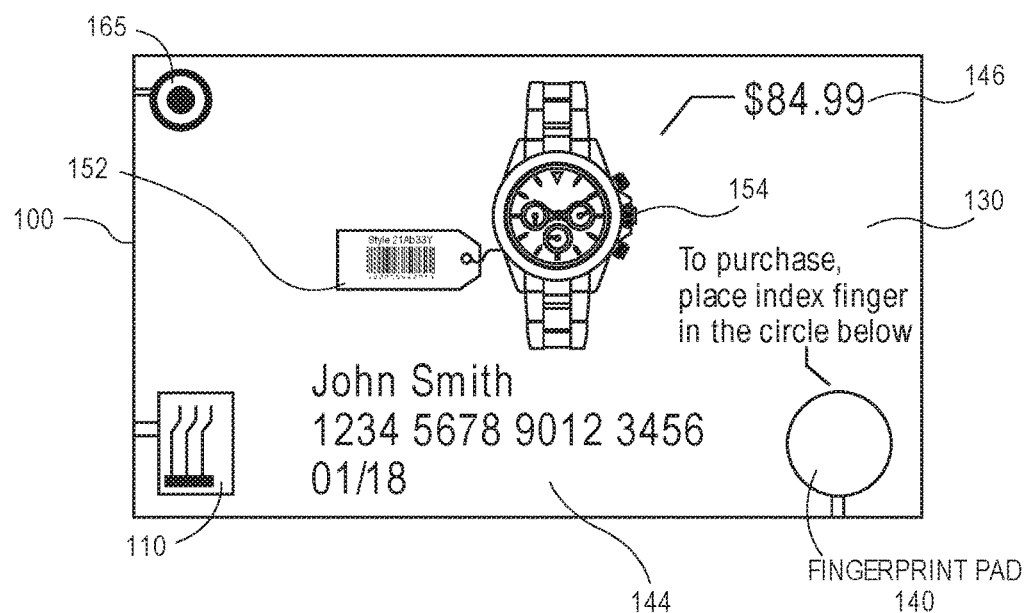

FIGS. 1A and 1B depict a portable device 100, in accordance with some embodiments of the invention. Portable device 100 comprises at least one of a display 130, input device 140, processor 110, and camera 165. In some embodiments, the display 130 may comprise, for example, a flexible OLED display. Flexible OLED displays are commercially available from companies such as UDC (Universal Display Corporation), LG, and Samsung. Transparent OLED displays are capable of 70% to 85% transparency when turned off. Transparent OLED pixels are nearly as clear as the glass or plastic substrate on which they are built. OLED pixels can be controlled so that they can display images, patterns, and colors. Transparent OLED displays are disclosed in U.S. Published Application No. 2011/0193477, WO 2013/131153, and U.S. Published Application No. 2015/0349292.

Input device 140 may include a fingerprint sensor or other biometric sensor. In another example, input device 140 may be a keypad or keyboard configured to receive selection of letters and/or numbers in a PIN or password. In still another example, input device 140 may be a microphone configured to receive a voice sample for authentication. In one embodiment, input device 140 may be omitted, and camera 165 may be used as an input device to obtain authentication data (e.g., a retinal scan)

FIG. 1A shows the portable device 100 while it is in a locked mode. No credentials associated with the portable device 100 are displayed in the locked mode. In some embodiments, the portable device 100 may generally be opaque in appearance in this mode, or it may be transparent.

As shown in FIG. 1A, the display 130 shows a prompt 142 requesting the user to unlock the portable device 100 by providing authentication data via the input device 140, e.g., by providing his or her fingerprint. In this example, the user may place his or her finger on the input device 140 (e.g., a fingerprint sensor) to provide fingerprint data. While this example describes authentication via a fingerprint, other methods of authentication may also be used. For example, voice authentication, eye scan, password, PIN, or any other method of authentication may be used. Upon receiving the authentication data from the user, the processor 110 may authenticate the user by comparing the user's authentication data to previously obtained authentication data associated with an authorized user of the portable device 100, and determining whether they match. The authentication data may be stored in a memory on the portable device 100 or it may be stored remotely (e.g., in the cloud) from the portable device 100.

Once the user is authenticated by the portable device 100, the portable device 100 may enter an "unlocked" mode. In the unlocked mode, the portable device 100 may display, via the display 130, at least one credential 144, such as a name, an ID number, an account number, an expiration date, a verification value, etc. Once the portable device 100 is unlocked, if it was previously opaque, the portable device can transform into a transparent or semi-transparent appearance. Alternatively, the portable device 130 may have been transparent or semi-transparent in the previously described locked mode.

Additionally, in some embodiments, the camera 165 may activate and continuously capture images of items behind the portable device 100. Accordingly, when capturing an image behind the portable device 100, if the portable device 100 is not inherently transparent or semi-transparent, it may appear to the user that she is seeing through the portable device 100. The image may also contain one or more identifiers. The portable device 100 can access or obtain data associated with the displayed item, and may display additional data associated with the displayed item adjacent to it.

Illustratively, a user may use the portable device 100 at a merchant, unlock the portable device 100, and then hold the portable device 100 in front of a product 154. The image including the item 154 may be captured by the camera 165, and an augmented reality module stored in the portable device 100 may augment the displayed item 154 with additional data 146 associated with the item 154 on the display screen 130. The additional data 146 may be derived from an identifier 152 which may be captured by the camera 165. The processor 110 may then determine the additional data 146 from the captured identifier 152. In such embodiments, the portable device 100 could communicate with a remote server at the merchant or at a nearby wireless access point to provide the identifier 152 and obtain the additional data 146 so that it can be displayed on the display 130. In some embodiments, the user may view the product and information such as manufacturer specifications, price, quantity remaining, etc.

In some embodiments, if the user decides that she wants to purchase the item 154, the user may optionally again provide authentication data via the same or different input device 140 to initiate a transaction. The processor 110 may again authenticate the user using the received authentication data.

Upon successful authentication, in some embodiments, the portable device 100 may communicate with an access device (e.g., point-of-sale device) and may provide the credentials and information relating to the selected item to the access device. The access device could thereafter generate an authorization request message, which may then be transmitted to an issuer computer, via an acquirer computer and a payment processing network computer. In other embodiments, the portable device 100 may generate an authorization request message and may communicate directly with a resource provider computer, an acquirer computer, a payment processing network, or an issuer computer to obtain authorization. In either scenario, the issuer computer may transmit an authorization response message back to the entity that generated the authorization request message (e.g., either the portable device 100 or the access device). At a later point in time, a clearing and settlement process can occur between the acquirer computer, the payment processing network, and the issuer computer.

Upon completion of the transaction, the payment device 100 may display, via display 130, a confirmation message to the user. The payment device 100 may then enter the locked mode once again.

In some embodiments, the portable device 100, once unlocked and authenticated, may enable data on a magnetic stripe such that the portable device 100 can be swiped at an access device similar to a traditional credit card.

Figure 2:
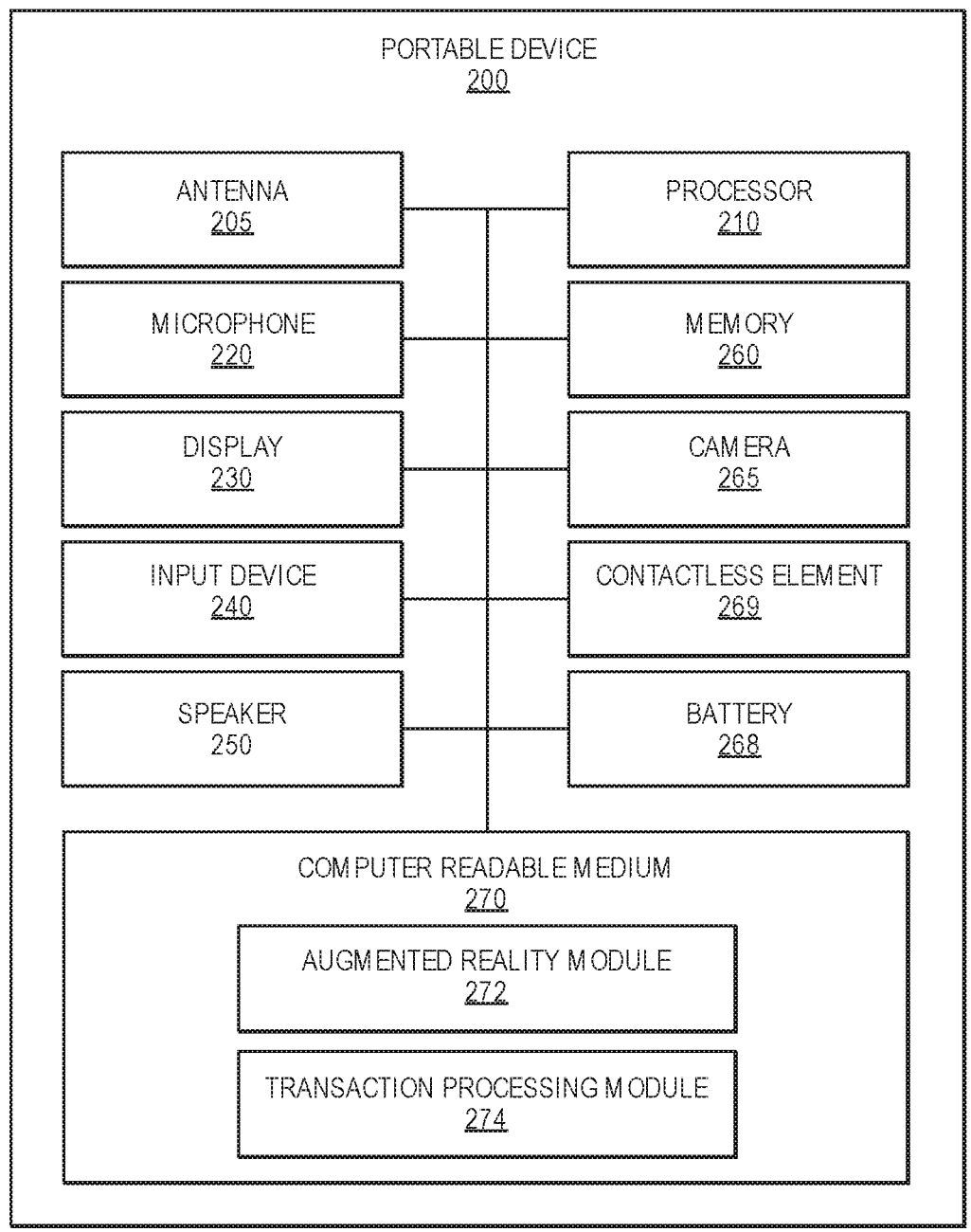
FIG. 2 is a block diagram of a portable device, in accordance with some embodiments of the invention.

FIG. 2 is a block diagram of a portable device 200, according to an embodiment of the present invention. Portable device 200 may be the same portable device as portable device 100. Portable device 200 includes a processor 210, an antenna 205, a microphone 220, a display 230, an input device 240, a speaker 250, a memory 260, a camera 265, a contactless element 269, a battery 268, and a computer-readable medium 270 that may be operationally and electrically coupled to the processor 210. Processor 210 may be any general-purpose processor operable to carry out instructions on the portable device 200.

Antenna 205 may comprise any suitable structure that can transmit or receive data. The antenna 205 can be capable of transmitting and receiving data to and from a remote server computer and through a telecommunications network.

Microphone 220 may be any device that converts sound to an electric signal. In some embodiments, microphone 220 may be used to capture voice data from a user (e.g., for voice commands or voice authentication purposes).

Display 230 may be any display that displays information to a user. In one example, the display 230 is a transparent OLED display. In one embodiment, the display 230 may encompass all or nearly all of the dimensions of the portable device 200 such that portable device 200 appears to be transparent.

Input device 240 may be any device used to capture authentication data. For example, input device 240 may be a keypad, a keyboard, and/or a fingerprint or other biometric sensor. In one embodiment, input device 240 is a fingerprint sensor that captures a digital image of the fingerprint pattern of a user. The captured image is called a live scan. This live scan may be digitally processed to create a biometric template (a collection of extracted features) which may be used for authenticating the user and "unlocking" the portable device 200.

Speaker 250 may be any device that outputs sound to a user. Examples may include a built-in speaker or any other device that produces sound in response to an electrical audio signal.

Memory 260 may be any magnetic, electronic, or optical memory. Memory 260 may include any number of memory modules. An example of memory 260 may be dynamic random access memory (DRAM). The memory 260 may also comprise a secure element, which may store credentials or authentication data.

Camera 265 may be configured to capture one or more images via a lens located on the body of portable device 200. The captured images may be still images or video images.

The camera 265 may include a CMOS image sensor to capture the images. Various applications running on processor 210 may have access to camera 265 to capture images. It can be appreciated that camera 265 can continuously capture images without the images actually being stored within portable device 200. Captured images may also be referred to as image frames.

Contactless element 269 may comprise components for near field communications data transfer (or another form of short range communications technology). The contactless element 269 may comprise an RFID chip and a transceiver.

Computer-readable medium 270 may be any magnetic, electronic, optical, or other computer-readable storage medium. Computer-readable medium 270 includes augmented reality module 272 and transaction processing module 274. Computer-readable storage medium 270 may comprise any combination of volatile and/or non-volatile memory such as, for example, buffer memory, RAM, DRAM, ROM, flash, or any other suitable memory device, alone or in combination with other data storage devices.

Augmented reality module 272 may be configured to, when executed by processor 210, present an augmented display, via display 230, to the user. The augmented reality module 272 may capture images via camera 265. Augmented reality module 272 may then augment the presentation of the item by overlaying text or images providing data associated with the image. In one example, the item may include a product. The product may have an identifier (e.g., barcode) affixed to it such that when the camera 265 captures one or more images of the product, the augmented reality module 272 may read the identifier and access or obtain product information based on data encoded in the identifier, as described further herein. The product information may include, but is not limited to, manufacturer specifications, descriptions, price, stock remaining, etc.

The computer readable medium 270 in the portable device 200 may also comprise a transaction processing module 274. The transaction processing module 274 may comprise code, executable by the processor 210, to cause the portable device to perform transaction processing using credentials that may reside on the portable device 200 or that may be accessible to the portable device 200 (e.g., retrieved from the cloud). The transaction processing module 274 may also comprise code for constructing authorization request messages and receiving authorization response messages from remote computers, or otherwise providing information needed to such remote computers so that they may construct authorization request messages. The transaction processing module 274 may also perform any encryption or other data security functions for any transactions.

Figure 3:
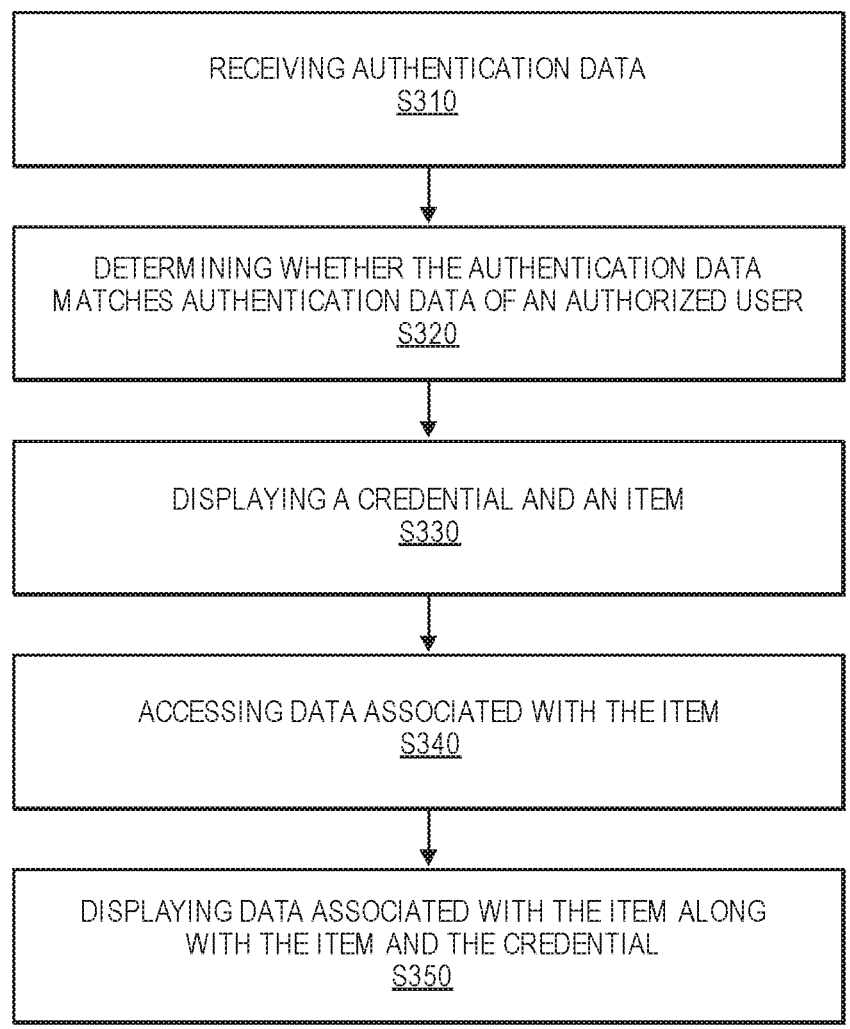
FIG. 3 shows a flow chart of a method for using a portable device, in accordance with some embodiments of the invention.

FIG. 3 shows a flow chart of a method for using a portable device, such as portable device 100 and/or portable device 200, in accordance with some embodiments of the invention.

At step S310, authentication data is received. The authentication data may be a password, PIN, pattern, and/or biometric data input by a user of the portable device. For example, a user may input a password or PIN on a keypad or keyboard associated with or displayed on the portable device. In another example, a user may trace a pattern on the display of the portable device. In still another example, a user may input biometric data, such as a voice sample through a microphone, an eye scan through a camera, and/or a fingerprint through a scanner or fingerprint sensor.

At step S320, it is determined whether the received authentication data matches authentication data of an authorized user. With respect to biometric data, one or more characteristics of the received biometric data may be compared to corresponding characteristics of the biometric data of the authorized user. For example, ridges and/or features (e.g., arches, loops, whorls, etc.) of a received fingerprint image may be identified and overlaid onto the fingerprint image of the authorized user to determine whether the same ridges and/or features exist in both.

The authentication data of the authorized user may have been previously obtained and stored as part of an initial set up process associated with the portable device, for example. In some embodiments, more than one different type of authentication data of the authorized user may be stored to allow for more than one method of authentication for a user. For example, as part of an initial set up process, an authorized user may provide more than one of a PIN, a password, an input pattern, a voice sample, a fingerprint, and an eye scan. If a first method of authentication fails, a different method of authentication may then be used to authenticate a user in some embodiments.

At step S330, a credential, an item, and data associated with the item, are displayed together on the portable device, after the user is authenticated. In one embodiment, the credential comprises sensitive information that is protected by virtue of it only being displayed after proper user authentication, such that it cannot be easily seen if the device is lost or stolen, or if a fraudster tries to obtain the information "over-the-shoulder". For example, the credential may be a PAN or other account number, a driver's license number, a social security number, an access code, a name, an address, a phone number, an e-mail address, or any other identifier.

If the received authentication data fully matches the authentication data of the authorized user (e.g., the received PIN has the same numbers in the same sequence as the PIN of the authorized user), the credential and the item can be displayed to the user. In another embodiment, the credential and the item can be displayed to the user if the received authentication data matches the authentication data of the authorized user above a predetermined threshold. This embodiment may be employed, for example, when the authentication data is biometric data, since it is unlikely that two sets of biometric data will perfectly match, even when taken from the same user. For example, the credential and the item may be displayed to the user if 85% of the identified features of the received fingerprint image are also found in the fingerprint image of the authorized user. However, it is contemplated that any predetermined threshold value or indicator may be used.

In some embodiments, if no match is made or if the match is below a predetermined threshold, additional authentication processing and/or authentication methods may be initiated prior to displaying the credential and the item. For example, the user may be prompted to reenter the same type of authentication data again (e.g., reenter a PIN if a PIN was entered the first time). In another example, the user may be prompted to enter a new type of authentication data (e.g., provide a fingerprint if a PIN was entered the first time). The type of authentication data provided by the user may be dependent upon what type of authentication data is available and previously stored that is associated with the authorized user. Providing a different type of authentication data may be advantageous in that a user may be authenticated using biometric data, for example, even if they forgot their PIN or password.

At step S340, data associated with the item may be accessed. The data associated with the item may comprise any suitable information associated with the scene being displayed. For example, if the display includes an image of a product, the associated data may comprise its price, description, manufacturer, specifications, where to purchase the product, quantity in stock, etc. If the display includes an image of a building owned by a business, the associated data may comprise its contact information, a description, a category of business, a website, a list of items and/or services for sale, etc.

The associated data may be determined based on one or more identifying features of the item. For example, the displayed image may contain an identifier such as a bar code, SKU, QR code, name, logo, trademark, design, pattern, etc. The identifier may be used to locate and retrieve relevant associated data.

The data associated with the item may be stored locally on the portable device, or may be obtained from a remote server or device. For example, if the displayed image includes an image of a product at a resource provider location, the data may be obtained from the resource provider. If the displayed image includes an image of a business, the data may be obtained from that business. In certain embodiments, some or all of the data may be obtained from the Internet.

At step S350, the data associated with the item is rendered on or proximate to the item. For example, text representing the price of a product may be overlaid onto an image containing the product, and displayed on a display on the device. Exemplary data overlaid proximate to an item is shown in FIG. 1B, described further above.

Figure 4:
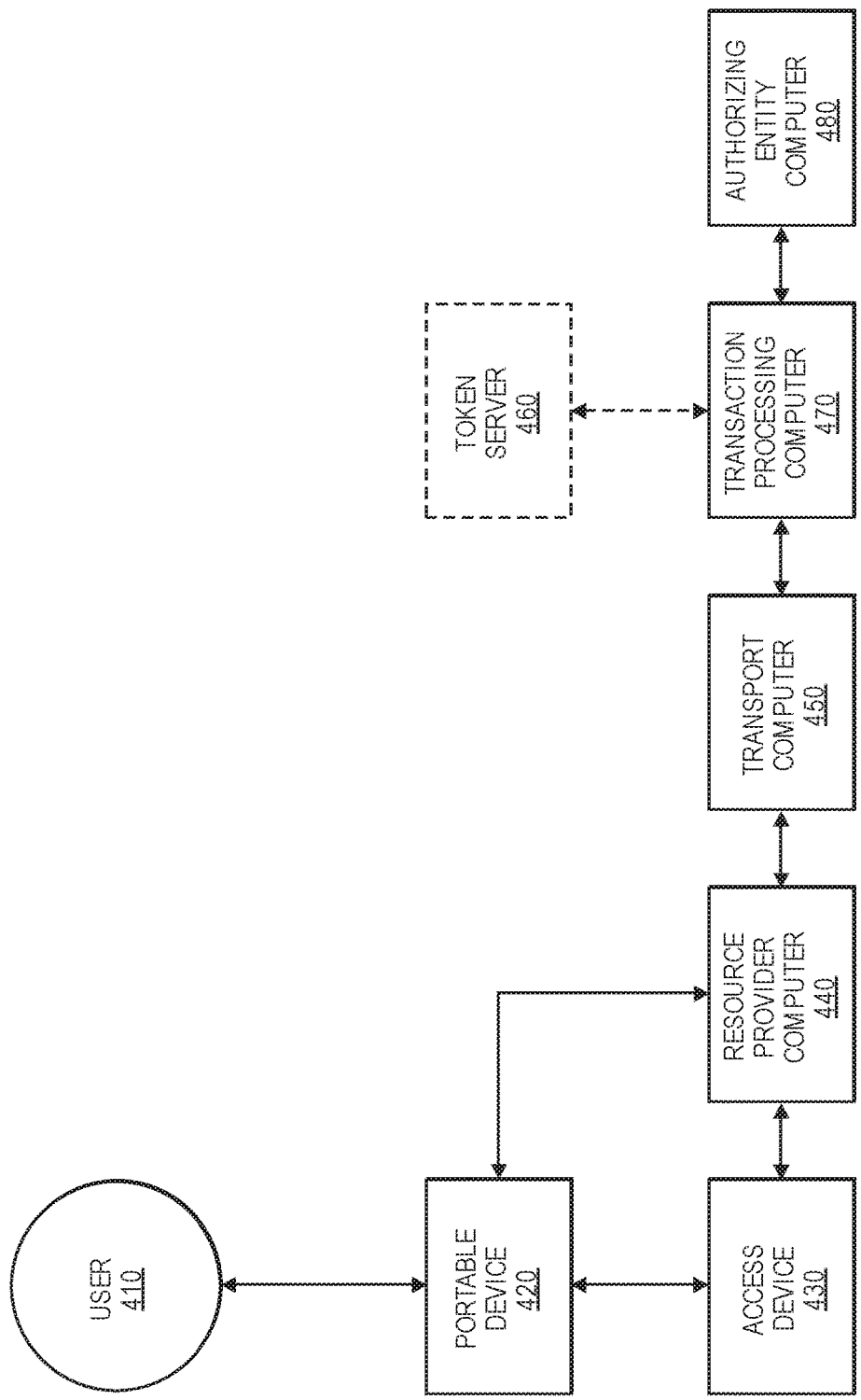
FIG. 4 shows a block diagram of a system for processing a transaction initiated by a portable device.

The portable device may alternatively or additionally be used to initiate a transaction. FIG. 4 shows a block diagram of a system for processing a transaction initiated by a portable device, in accordance with some embodiments of the invention. The system includes a portable device 420 (as described above with respect to portable devices 100 and/or portable device 200), an access device 430, a resource provider computer 440, a transport computer 450, an optional token server 460, a transaction processing computer 470, and an authorizing entity computer 480. Each of these systems and computers may be in operative communication with each other. In some embodiments, the portable device 420 may be operated by a user 410.

For simplicity of illustration, a certain number of components are shown in FIG. 4. It is understood, however, that embodiments of the invention may include more than one of each component. In addition, some embodiments of the invention may include fewer than or greater than all of the components shown in FIG. 4. In addition, the components in FIG. 4 may communicate via any suitable communication medium (including the Internet), using any suitable communication protocol.

The resource provider computer 440 may be configured to receive and fulfill requests for data associated with items (e.g., price, description, specifications, quantity in stock, etc.). The resource provider computer 440 may also be configured to receive transaction data from the access device 430 and/or the portable device 420, and to formulate authorization request messages. Resource provider computer 440 may enable a resource provider such as a merchant to engage in transactions, sell goods or services, or provide access to goods or services to a consumer. The resource provider computer 440 may accept multiple forms of payment and may use multiple tools to conduct different types of transactions. For example, the resource provider computer 440 may communicate with, include, or be an access device 430 at a physical store operated by the merchant for in-person transactions. The resource provider computer 440 may also enable the merchant to sell goods and/or services via a website, and may accept payments over the Internet.

The transport computer 450 is typically a system for an entity (e.g., a bank) that has a business relationship with a particular resource provider or other entity. The transport computer 450 may route an authorization request for a transaction to the authorizing entity computer 480 via transaction processing computer 470.

The transaction processing computer 470 may be associated with one or more payment service providers. The transaction processing computer 470 may include a token exchange module in communication with a token server 460 that is able to "translate" payment tokens back into the original PANs. For example, if the credential associated with portable device 420 is a token, the token will be used in the authorization request message that is passed to the transaction processing computer 470. The transaction processing computer 470 may request the PAN associated with the token from the token server 460, and may replace the token with the PAN in the authorization request message. Then, the transaction processing computer 470 may pass the authorization request message (including the PAN) to the authorizing entity computer 480.

The authorizing entity computer 480 is typically run by a business entity (e.g., a bank) that may have issued the credential used by the portable device 420 for the transaction. Some systems can perform both authorizing entity computer 480 and transport computer 450 functions. When a transaction involves a payment account associated with the authorizing entity computer 480, the authorizing entity computer 480 may verify the account and respond with an authorization response message to the transaction processing computer 470 that may be forwarded to the transport computer 450, the resource provider computer 440, and the access device 430.

At a later time (e.g., at the end of the day), a clearing and settlement process can occur between the transport computer 450, the transaction processing computer 470, and the authorizing entity computer 480.

Figure 5:
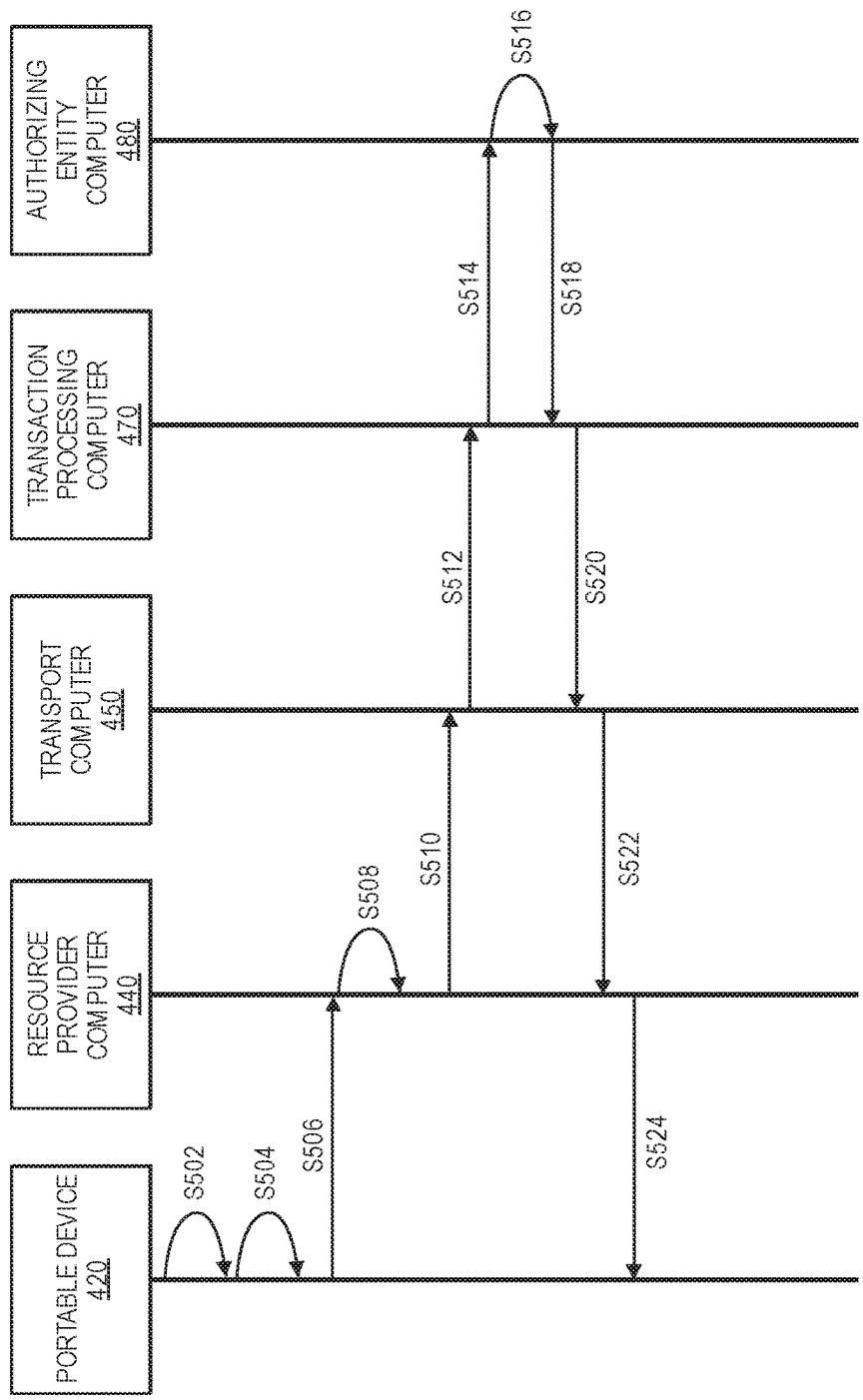
FIG. 5 shows a flow diagram of a method for processing a transaction initiated by a portable device.

FIG. 5 shows a flow chart of a method for processing a transaction initiated by a portable device, in accordance with some embodiments of the invention. At step S502, the portable device 420 receives authentication data from a user. At step S504, the portable device 420 determines whether the received authentication data matches authentication data of an authorized user. At step S506, if the user is authenticated, the portable device 420 transmits a credential (e.g., a PAN or token) and a product identifier to the resource provider computer 440.

At step S508, the resource provider computer 440 generates an authorization request message with transaction data (e.g., a transaction amount associated with the product) and the credential, and sends the authorization request message to a transport computer 450 at step S510. The transport computer 450 forwards the authorization request message to the transaction processing computer 470 at step S512. In one embodiment, if the credential is a token, the transaction processing computer 470 obtains the PAN associated with the token and replaces the token with the PAN in the authorization request message. The transaction processing computer 470 forwards the authorization request message to the authorizing entity computer 480 at step S514.

At step S516, the authorizing entity computer 480 then determines if the transaction can be authorized. The authorizing entity computer 480 may determine if the account associated with the PAN in the authorization request message has sufficient funds or credit, and may also determine if the transaction exceeds a predetermined fraud threshold. At step S518, after the authorizing entity computer 480 makes the authorization decision, it may generate and send an authorization response message approving or denying the transaction back to the transaction processing computer 470.

In one embodiment, when a token was received in the original authorization request message, the transaction processing computer 470 may determine the token from the PAN, and insert the token into the authorization response message to replace the PAN. At step S520, the transaction processing computer 470 may forward the authorization response message back to the transport computer 450, which forwards it back to the resource provider computer 440 at step S522. After the transaction has been completed, a confirmation message may be sent from the resource provider computer 440 to the portable device 420 at step S524.

At a later point in time, a clearing and settlement process can occur between the transport computer 450, the transaction processing computer 470, and the authorizing entity computer 480. The resource provider computer 440 may first provide a file with the credential and the associated transaction data to the transport computer 450. The transport computer 450 may then transmit any clearing and settlement messages to the transaction processing computer 470 using the credential. If the credential is a token, the token may be converted into the real PAN as described above in the authorization process to facilitate the exchange of messages and the transfer of funds between the transport computer 450 and the authorizing entity computer 480.

In other embodiments of the invention, the portable device 420 may transmit the credential, an amount of the item to be purchased, and a merchant identifier (e.g., a merchant ID or account number) directly to the transport computer 450, the transaction processing computer 470 or the authorizing computer 480 for authorization. Any one of these entities or the portable device 420 itself can generate an authorization request message. The authorizing entity computer 480 may determine if the transaction is authorized and may reply back with an authorization response message as described above. Note that these embodiments have advantages, since the credential on the portable device 420 need not be passed to the merchant, thereby maintaining the security of the credential.

Systems and methods described herein may be applied outside of financial transaction contexts as well. For example, embodiments of the invention may be utilized to grant access privileges to authorized users. FIG. 6 shows a block diagram of a building access system, in accordance with some embodiments of the invention. A user 610 operates a portable device 620, which may be any of portable devices described herein. User 610 may unlock portable device 620 by providing authentication data, and the camera may be activated. User 610 can capture an image of a building address number on a door, for example, and an entry code can be obtained by the portable device and overlaid onto the image of the apartment number. In one example, the entry code can be entered by the user 610 into access device 630 (e.g., when access device 630 is a keyboard or keypad). In another example, the entry code can be transmitted directly from the portable device 620 to the access device 630 (e.g., by NFC). The access device 620 may then proceed to allow or deny access by the user 610 to the building 690.

Embodiments of the invention provide for a number of advantages. For example, because sensitive credentials are not displayed until a user is authenticated, the credentials are secure from "over the shoulder" attempts to obtain this information. In addition, the portable device can display the item to be accessed or purchased along with other information, and can initiate a transaction process. This makes transaction processing much more convenient as the user can use a single device to see the item to be accessed or obtained, any additional information associated with it, obtain credentials need to process a transaction, and initiate a transaction.

The various participants and elements described herein with reference to FIGS. 1-6 may operate one or more computer apparatuses to facilitate the functions described herein. Any of the elements in FIGS. 1-6, including any servers or databases, may use any suitable number of subsystems to facilitate the functions described herein.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A portable device comprising:
a display;
an input device;
a camera;
a processor coupled to the display, the input device, and the camera; and
a non-transitory computer readable medium coupled to the processor, the non-transitory computer readable medium comprising code, which when executed by the processor, causes the portable device to:
receive authentication data from the input device while the display is in a locked mode that prevents a transaction credential from being displayed;
determine whether the received authentication data corresponds to previously stored authentication data associated with an authorized user by:
comparing the received authentication data with the previously stored authentication data associated with the authorized user; and
determining whether the received authentication data matches the previously stored authentication data above a predetermined threshold percentage;
in response to determining that the received authentication data corresponds to the previously stored authentication data associated with the authorized user:
transition the display from the locked mode into a transaction mode to allow an item positioned behind the portable device to be shown on the display;
capture, by the camera, an image of the item and an item identifier placed proximate to the item;
present an image of the item positioned behind the portable device on the display;
retrieve item information associated with the item using the item identifier associated with the item;
overlay the item information onto the image of the item being presented on the display; and
display the transaction credential on the display; and
initiate a transaction to purchase the item by providing, to an access device or a server computer, the item identifier and the transaction credential that was previously prevented from being displayed in the locked mode, wherein the transaction is approved or denied based on whether the transaction credential corresponds to a valid account identifier associated with the authorized user.

2. The portable device of claim 1, wherein the item identifier comprises one or more of a bar code, a QR code, a name, a logo, a trademark, and a SKU.

3. The portable device of claim 1, wherein the portable device is in the form of a card and wherein the display comprises a flexible OLED display.

4. The portable device of claim 1, wherein transitioning the display from the locked mode into the transaction mode comprises:
transforming the display from an opaque appearance to a transparent or semi-transparent appearance to allow a user to view the item through the portable device.

5. The portable device of claim 1, wherein the authentication data is first authentication data, and the code, which when executed by the processor, further causes the portable device to:
prior to initiating the transaction:
receive second authentication data; and
determine whether the second authentication data matches those of the authorized user.

6. The portable device of claim 1, wherein the input device is a biometric sensor.

7. The portable device of claim 5, wherein the second authentication data is received by a different input device than the input device that received the first authentication data.

8. The portable device of claim 1, wherein the portable device is in the form of a card, and the input device is a fingerprint sensor disposed on the card.

9. The portable device of claim 1, wherein transitioning the display from the locked mode into the transaction mode comprises:
activating the camera to capture the image of the item positioned behind the portable device.

10. A method of conducting a transaction using a portable device, the method comprising:
receiving authentication data from an input device of the portable device while a display of the portable device is in a locked mode that prevents transaction credentials from being displayed;
determining whether the received authentication data corresponds to previously stored authentication data associated with an authorized user by:
comparing the received authentication data with the previously stored authentication data associated with the authorized user; and
determining whether the received authentication data matches the previously stored authentication data above a predetermined threshold percentage;

in response to determining that the received authentication data corresponds to the previously stored authentication data associated with the authorized user:
- transitioning the display from the locked mode into a transaction mode to allow an item positioned behind the portable device to be shown on the display;
- capturing, by a camera of the portable device, an image of the item and an item identifier placed proximate to the item;
- presenting an image of the item positioned behind the portable device on the display;
- retrieving item information associated with the item using the item identifier associated with the item;
- overlaying the item information onto the image of the item being presented on the display; and
- displaying the transaction credential on the display; and initiating a transaction to purchase the item by providing, to an access device or a server computer, the item identifier and the transaction credential that was previously prevented from being displayed in the locked mode, wherein the transaction is approved or denied based on whether the transaction credential corresponds to a valid account identifier associated with the authorized user.

11. The method of claim 10, wherein the item identifier comprises one or more of a bar code, a OR code, a name, a logo, a trademark, and a SKU.

12. The method of claim 10, wherein the portable device is in the form of a card and wherein the display comprises a flexible OLED display.

13. The method of claim 10, wherein the authentication data is first authentication data, and the method further comprises: prior to initiating the transaction: receiving second authentication data; and determining whether the second authentication data matches those of the authorized user.

14. The method of claim 10, wherein transitioning the display from the locked mode into the transaction mode comprises:
transforming the display from an opaque appearance to a transparent or semi-transparent appearance to allow the item to be viewed through the display.

15. The method of claim 10, wherein the input device is a biometric sensor.

16. The method of claim 15, wherein the second authentication data is received by a different input device than the input device that received the first authentication data.

17. The method of claim 10, wherein the portable device is in the form of a card, and the input device is a fingerprint sensor disposed on the card.

18. The method of claim 10, wherein transitioning the display from the locked mode into the transaction mode comprises:
activating the camera of the portable device to capture the image of the item positioned behind the portable device.

* * * * *

UNITED STATES PATENT AND TRADEMARK OFFICE
CERTIFICATE OF CORRECTION

PATENT NO. : 10,078,744 B2
APPLICATION NO. : 15/058440
DATED : September 18, 2018
INVENTOR(S) : Duane Matthew Cash Page 1 of 1

It is certified that error appears in the above-identified patent and that said Letters Patent is hereby corrected as shown below:

In the Claims

In Column 16, Claim 1, Line 6, please remove "using the item identifier associated with" and insert -- using an item identifier associated with --

In Column 17, Claim 10, Line 13, please remove "using the item identifier associated with" and insert -- using an item identifier associated with --

In Column 17, Claim 11, Line 27, please remove "a OR code" and insert -- a QR code --

In Column 18, Claim 16, Line 16, please remove "15" and insert -- 13 --

Signed and Sealed this
Twentieth Day of November, 2018

Andrei Iancu
*Director of the United States Patent and Trademark Office*